June 7, 1966  I. E. COX  3,254,925
BEARINGS
Filed Oct. 12, 1962  5 Sheets-Sheet 1

INVENTOR.
ISAAC EUGENE COX
BY
Wallace Kinzer and Dorn
ATTORNEYS

INVENTOR.
ISAAC EUGENE COX

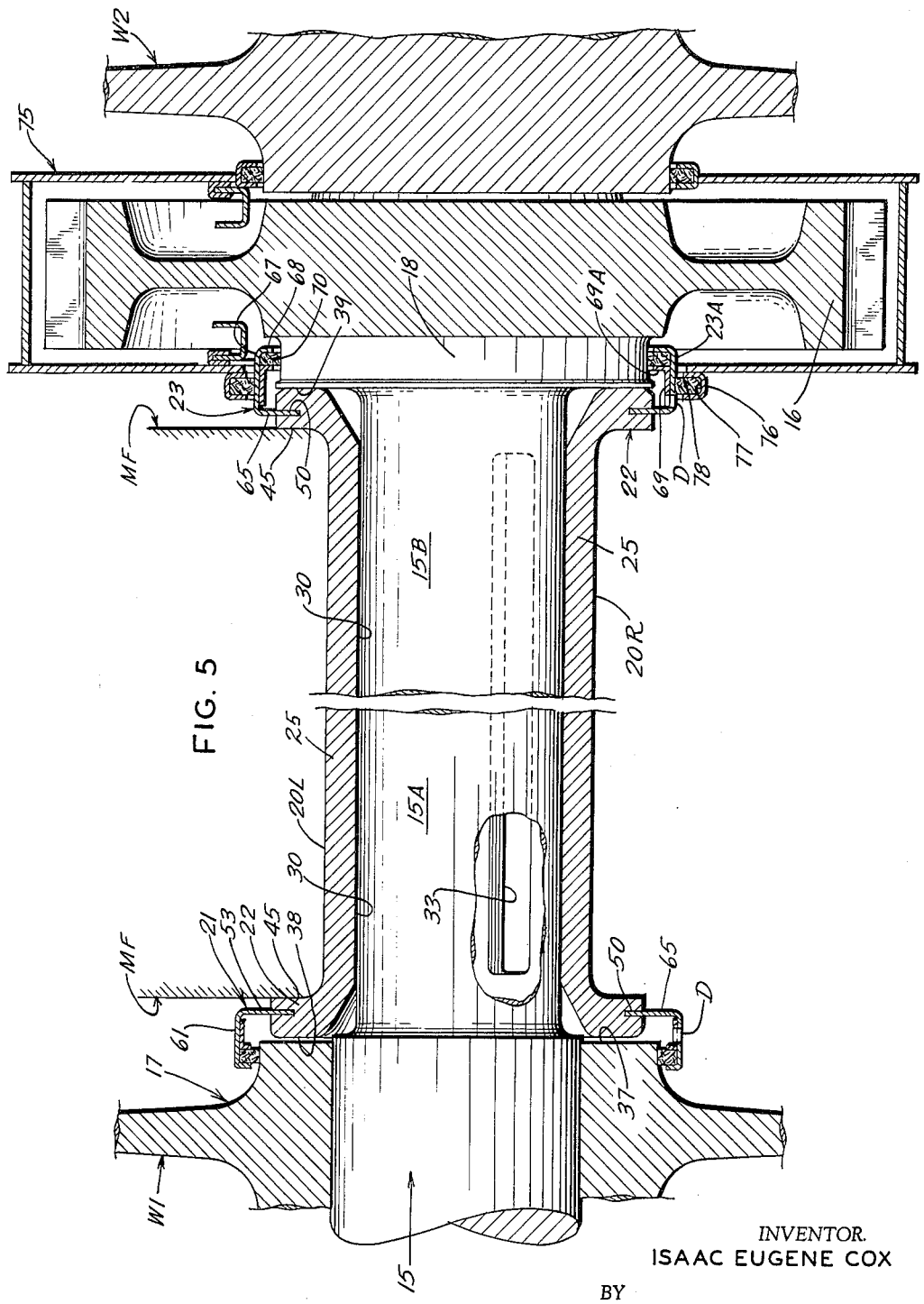

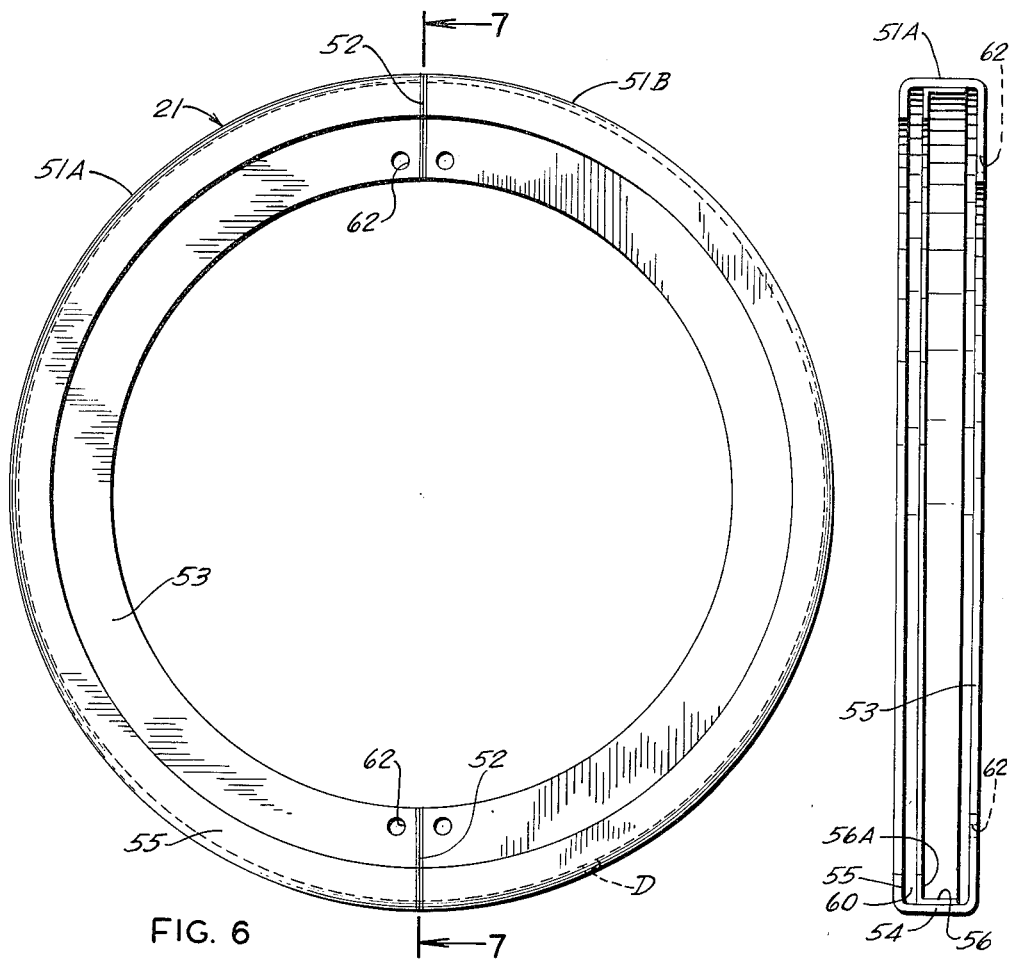
FIG. 6
FIG. 7
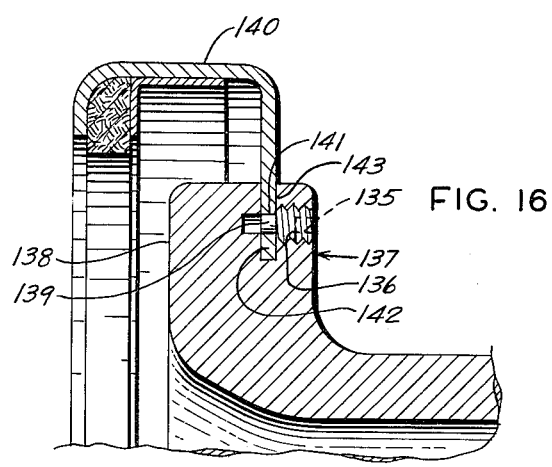
FIG. 16
*INVENTOR.*
ISAAC EUGENE COX
BY
*Wallace Kinger and Dorn*
ATTORNEYS

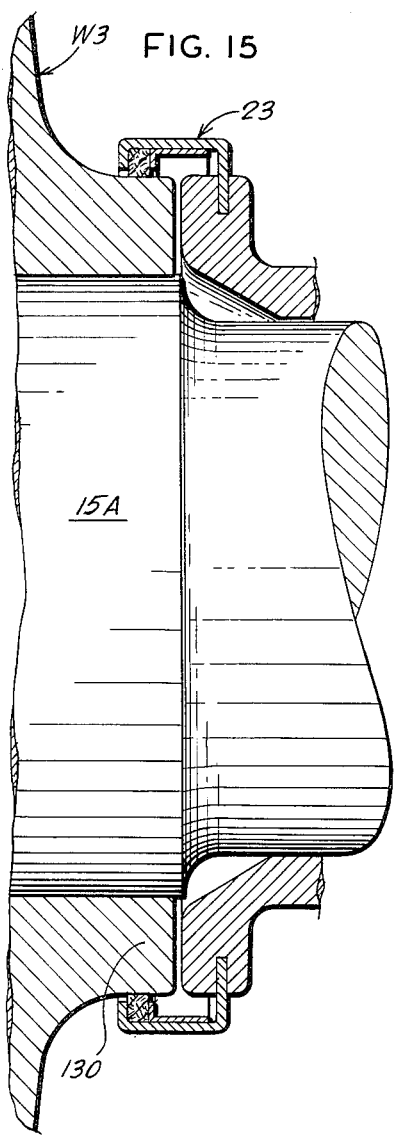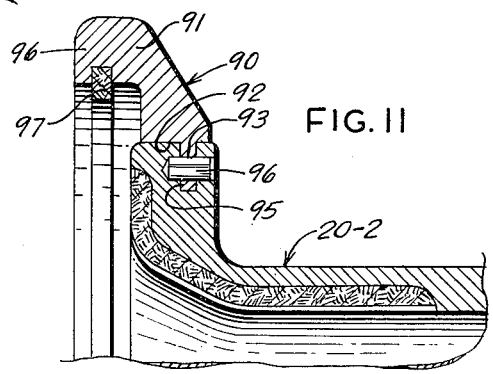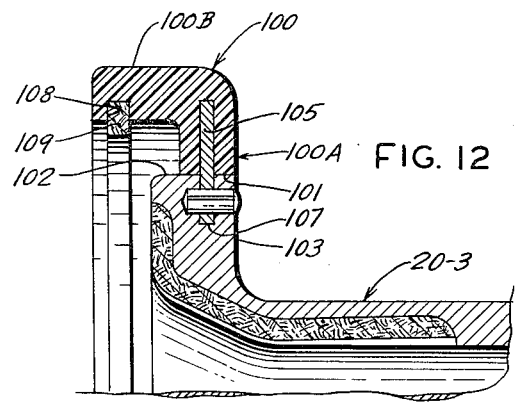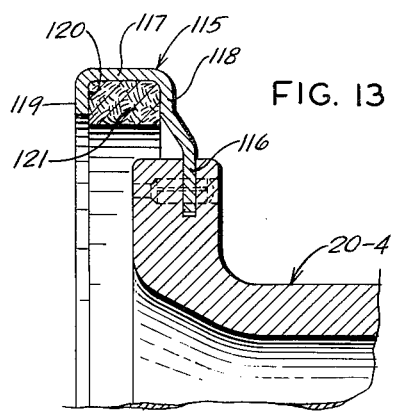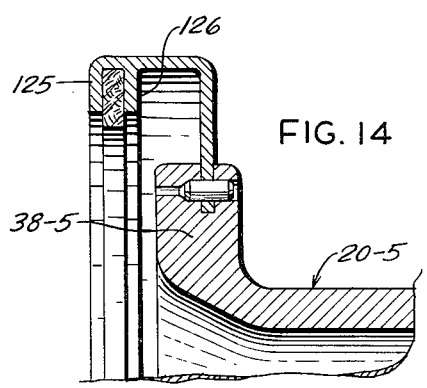

United States Patent Office 3,254,925
Patented June 7, 1966

3,254,925
BEARINGS
Isaac Eugene Cox, Kirkwood, Mo., assignor to American Brake Shoe Company, New York, N.Y., a corporation of Delaware
Filed Oct. 12, 1962, Ser. No. 230,055
9 Claims. (Cl. 308—36.1)

This invention relates to an axle bearing specifically for an axle driven by a traction motor such as in a diesel locomotive or the like.

In a diesel locomotive, an axle is provided with a relatively large drive gear driven by a pinion. The pinion in turn is the driving element of a traction motor carried on a frame that extends between the wheels associated with the driven axle. The motor receives its energy from a generator in turn driven by the diesel engine of the locomotive.

The gear on the axle that is driven by the motor pinion is located immediately inward of one of the wheels on the axle, and is secured to the axle as by a press-fit. The axle is supported by bearings that are mounted in bearing housings that project from the motor frame, and these bearings are respectively identified as associated with the pinion end of the axle, and the opposite or commutator end of the axle.

The conventional bearing for supporting axles of the aforesaid kind is a split bearing, that is, one which includes a pair of 180° segments that are assembled about the axle to afford a 360° bearing support. In other words, in the standard construction, four 180° bearing segments are required for the axle, two segments affording a 360° bearing bore supporting the commutator end of the motor on the axle, and two bearing segments affording a 360° bearing bore supporting the pinion end of the motor on the axle.

As noted above, the two bearings are associated with bearing supports or housings that are included as a part of the motor frame. Thus, the bearings concentrically surround the axle and in turn are concentrically embraced by bearing support elements that are a part of the motor frame.

It is of course essential that the bearing surfaces of the assembled bearing segments be as clean and smooth as possible. Thus, it is important that the surfaces of the axle and bearing bore be finished with precision techniques and be maintained in their pristine condition, not only from the standpoint of assuring the desired anti-friction characteristics for smooth running conditions, but also to avoid damage to the axle or bearing bore that might result in a failed bearing or a damaged axle, either of which can contribute to a train derailment disaster.

It is therefore necessary to provide dust guard seal means at the flanged end of the commutator end axle bearing inclusive of a 360° seal ring that embraces the hub of the adjacent wheel to prevent contamination of the bearing at the commutator end of the axle. In like manner, means are provided at the flanged end of the pinion end axle bearing and present a 360° seal ring to the hub associated with the driven gear on the axle. The seals in conjunction with the bearing support housings and related parts complete an enclosure for the axle between the two identified hubs.

Axle bearing dust guards of the aforesaid kind are presently of two general types. In one form, the dust guard is provided as an integral part of the bearing segments for the commutator end of the axle so as to present a 360° seal ring with respect to the wheel hub simultaneously with the segments being assembled at the commutator end of the axle. Such an association of the bearing segment and the seal segment is disclosed in Patent No. 2,954,263.

This arrangement is objectionable from several different standpoints. In the first place, the bearing segments for the commutator end of the axle, being cast with an integral dust guard, are not interchangeable with the bearing segments for the pinion end of the axle. Therefore, it is necessary for the locomotive manufacturer to maintain an inventory of bearing segments for the commutator end of the axle, and a separate inventory of different bearing segments for the pinion end of the axle. When it is realized that locomotive wheels themselves are of at least two different sizes from the standpoint of hub diameter to be engaged by a dust guard seal, the inventory problem becomes extremely awkward.

In addition to the complex inventory problem presented by bearing segments having dust guards cast integral therewith, there is also an objection from the standpoint of cost of manufacture as well as the extra weight added to the bearing necessitated by heavy sections in the castings required to present an acceptable, sturdy dust guard arrangement.

The second form of dust guard that is presently known is the so-called separable bolted type which is more common than the first form. The separable dust guard of the bolted type is, like the bearing, afforded by two separable 180° segments which are assembled in concentric relation about the axle between the wheel hub and the adjacent flanged end of the commutator end axle bearing, but this can only be accomplished after the bearings have been installed. Thus, the dust guard segments are manipulated between the wheel hub and the adjacent end of the motor frame so that the mating ends of the dust guards are properly related and the wheel hub embraced. At the same time it is necessary to apply dowel pins or other means to the dust guard segments which secure the same in fixed relation on the flanged end of the commutator end axle bearing. Thereafter, the mating ends of the dust guard are bolted together. It should be here noted that the initial manufacturing assembly is actually completed on an inverted locomotive truck in order that the workman can have better access to the fastenings that are involved.

When removing and replacing the commutator end axle bearing and/or dust guard in the truck after being installed under the locomotive, the attachments for the separable dust guard including the bolts which join the 180° segments, and the dowel pins which locate the guard on the flanged end of the commutator end axle bearing, are quite inaccessible, and a great deal of time is consumed in removing the separable dust guard segments when required. It will therefore be seen that this type of dust guard is expensive and difficult to apply.

The primary object of the present invention is to eliminate the problems presented by the dust guard constructions discussed above, and specifically it is an object of the present invention to do this by constructing bearing segments that can interchangeably be mounted at the commutator end of the axle or the pinion end of the axle, with the thrust flanges provided with mounting pockets in which dust guard seal segments can be fitted interchangeably, and present at the time the bearing halves are mounted in place in the bearing supports of the motor frame. Yet more specifically, it is an object of the present invention to equip split bearing segments for a locomotive axle each with a circumferential groove or mounting pocket in the flange of the bearing, each such groove being continuous from the one longitudinal parting or mating face of the bearing segment to the other, such that when the attaching flange of the related segmental dust guard seal is properly disposed therein, the related seal will afford a 360° seal ring when associated with a similarly constructed complemental bearing half. As a consequence, the bearing segments can be interchangeably mounted on the commutator end of the axle or the pinion end of the axle, appropriate seal segments being selected at the time, if desired, as will be noted hereinafter.

It was mentioned above that a seal is not only to be afforded with respect to the wheel at the commutator end of the axle, but there is also to be a seal with the hub of the driven gear of the axle.

Heretofore the gear case seals and dust guards have been commonly provided as integral parts of a fabricated sheet steel gear case, split on the longitudinal center line of gear and pinion, and attached to the motor frame on projecting lugs with a bolt at each end, holding the split gear case together and securing it to the motor frame. Thus gear seals and dust guard seals carried in the gear case openings for the gear and wheel hubs are inherently difficult to locate and maintain in a precisely concentric position relative to the rotating gear and wheel hubs. Any appreciable eccentricity due to improper position or operational vibration will disrupt the gear seal.

The gear case dust guard in the side of the gear case opposite the motor fits on the rotating wheel hub adjacent the gear. The gear, wheel hub and axle are all concentric, so the concentricity and function of the gear case dust guard is controlled by positioning it in the gear case. This is true both as to prior arrangements and the arrangement provided under the present invention.

The gear case in prior arrangements carries a split annular member affixed in the split gear case openings on the side adjacent the motor for the gear hub and the flange of the pinion end axle bearing. This split annular ring contains both the co-axial gear case seal and the gear seal in closely adjacent internal annular grooves provided in this split annular ring. The gear case seal seats on the peripheral surface of the flange of the non-rotative pinion end axle bearing and the gear seal fits on the rotating gear hub.

The function of the gear seal is to prevent leakage of the gear lubricant, a heavy, tarry viscous compound, from entering in the thrust bearing surface between the gear hub and the flange face of the pinion end axle bearing and interfering with its proper lubrication. Another function of the gear seal is to prevent end leakage of the thin light oil from the pinion end axle bearing entering into the gear case, and diluting the gear case lubricant to where it would not properly lubricate the gearing.

The function of the gear case seal is to keep the dust and dirt out of the pinion end axle bearing.

The space between these adjacent seals is vented with a drain hole at the bottom to permit any seal leakage to escape and prevent any pressure build-up in this space, which would load and flood the seals and cause them to leak rapidly.

In the prior arrangement discussed above, space limitations prevent the use of a slinger on the rotating gear hub to throw off seal leakage in the vented and drained annular space between the gear seal and the gear case seal, thus tending to flood and load both the gear and the gear case seals.

These disadvantages are overcome in the present invention by having the gear case seal located on the outside of the gear seal casing, so the gear case seal externally encompasses the gear seal, virtually in the same plane, instead of being coaxially adjacent to it. This arrangement provides the necessary longitudinal space on the rotating gear hub to provide a slinger to prevent seal flooding and loading and permit the use of more effective sealing members of increased width.

Another disadvantage of the prior arrangement discussed above is overcome in the present invention by interposing the resilient concentric cushion of the gear case sealing member between the gear case and the gear seal, providing a more efficacious relationship between the gear seal and the gear case seal, since with this arrangement the gear case seal can move independently of the gear hub and pinion end axle bearing in absorbing the operational vibration of the gear case structure. In the prior arrangement, any gear case movement caused by operational vibration caused eccentric movement of the gear seal, tending to disrupt it.

Another disadvantage of the prior design is overcome herein by rigidly and tightly securing the split gear seal or dust guard on the flanges of the two segmental halves of the pinion end axle bearing in a manner that permits easy assembly and removal, and so arranged that the gear seal can be assembled on the pinion end bearing prior to its application on the axle. This feature provides a separable gear seal for the pinion end axle bearing that can be preapplied to the bearing before its assembly, and permits facile replacement of the gear seal independent of the gear case seal and similarly the replacement of the gear case seal independent of the gear seal.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 5 is a sectional view showing bearing segments of the present invention assembled on the commutator and pinion ends of the driven axle of a locomotive;

FIG. 6 is a plan view of a dust guard adapted to be removably associated with the bearing shown in FIGS. 1, 2 and 3;

FIG. 7 is an end view of one of the dust guard segments illustrated in FIG. 6, being taken on the line 7—7 of FIG. 6;

FIGS. 11 to 14 are sectional views similar to FIG. 4 illustrating modified constructions of dust guard segments within the purview of the present invention;

FIG. 15 is a sectional view similar to FIG. 5 illustrating the manner in which a bearing constructed under the present invention is readily adapted to a wheel having a hub different in diameter than the wheels shown in FIG. 5; and FIG. 16 is a detail sectional view illustrating still another way in which a seal segment may be secured in place under and in accordance with the present invention.

Figure 1:
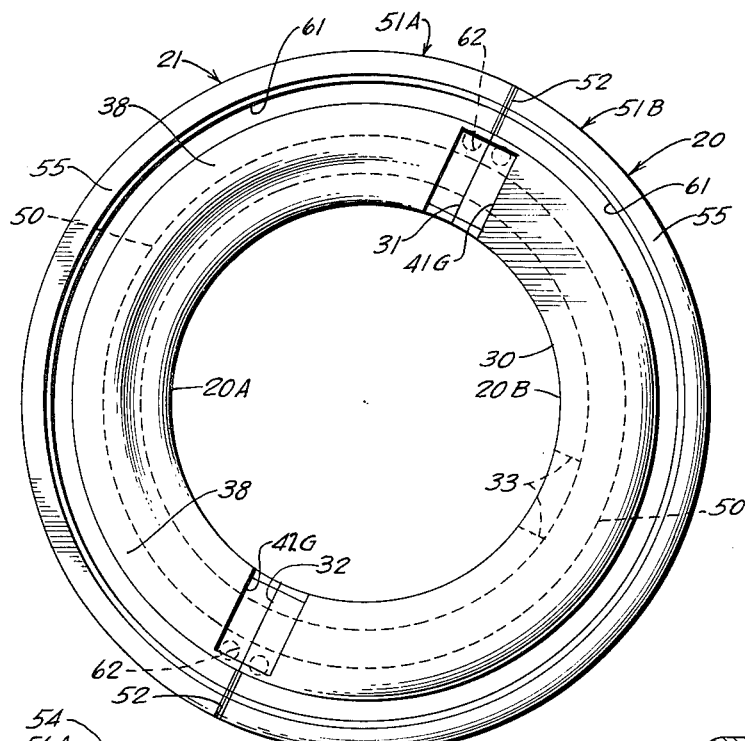
FIG. 1 is an end view of a bearing embodying the principles of the present invention.

Referring for the moment to FIG. 5 of the drawing, this is a section showing a pair of locomotive wheels W1 and W2 associated with an axle 15 of a locomotive or the like. The axle 15 inward of the right-hand wheel W2, as viewed in FIG. 5, has a driven gear 16 press-fitted thereto, and this gear is driven by the pinion of a traction motor (not shown). The wheel W1 which is remote from the gear 16 is located adjacent what is known as the commutator end 15A of the axle 15, and the gear 16 is located adjacent what is known as the pinion end 15B of the axle 15.

The axle 15 is associated with a motor housing or frame MF, and in fact the axle 15 is supported for rotation in a pair of left and right-hand bearings 20L and 20R (constructed in accordance with the present invention as will be described in detail hereinafter) which in turn are clamped to the frame MF much in the manner illustrated in my Patent No. 2,827,343. The bearings 20L and 20R are of identical construction and either will, at times herein, be referred to as the bearing 20.

The wheel W1 has a hub 17, and the gear 16 has a hub 18 with respect to which seals or so-called dust guards are provided as attachments to the bearing in accordance with the present invention in order to prevent foreign matter from gaining access to the bearing bore that might result in damage to the surfaces of the axle and the bearings that are in engagement. Thus, if such seals were not present, scoring of the axle and the bearing surfaces is likely to occur, giving rise to the possibility of bearing or axle failure with resultant derailment of the train. Additionally, the seals prevent loss of oil that is furnished to the engaged surfaces of the axle and the bearings as will be evident from what will be described hereinafter.

It will be recognized from what is shown in FIG. 5 that the diameter of the axle is constant between the extremes of the commutator end and the pinion end thereof. It would be desirable, therefore, to have the axle bearings interchangeable so as to be capable of being fitted alternatively on the commutator end or the pinion end of the axle. However, this is not possible in the instance of segmental bearings for traction axles as heretofore constructed with an integral dust guard that is to be associated with the hub of what corresponds to the wheel W1, because such integral dust guard is not adapted for installation at the pinion end where the gear 16 is located. As a consequence, it is necessary to maintain a complex inventory of bearings under such circumstances.

Further, as to the proposal concerning a separable dust guard of the bolted type that is to be installed between what corresponds to the wheel W1 and the end of the motor frame MF adjacent thereto, this entails quite complicated installation procedures, especially since the separable dust guard must be applied after the bearings are installed and not simultaneously therewith. Moreover, the removal of such separable dust guard is particularly difficult because of the inaccessibility of the attaching bolts.

The foregoing difficulties are overcome under the present invention by so forming a bearing as 20, FIGS. 1 and 5, as to enable a separable dust guard or seal element 21 to be detachably associated with the thrust flange 22 thereof at the commutator end of the axle, or alternatively, to receive a seal element or dust guard 23 at the pinion end of the axle. The dust guard 21 includes a seal ring that hugs the hub 17 of the wheel W1, and in like manner the dust guard or gear seal element 23 is provided with a seal ring that hugs the hub 18 of the gear 16.

These seal rings are afforded by 180° arcuate segments that correspond to the 180° segments which afford the ultimate bearing assemblies that define the 360° bearing bores in which the axle 15 is rotatably supported. The primary advantage of the bearing construction of the present invention is that only a single inventory of bearing segments is required, each capable of having a seal segment of the desired kind associated therewith at the time the bearing is installed, either at the commutator end of the axle or the pinion end of the axle; and by the same token, for wheels having a hub of a different size, a seal segment can be selected that is specifically designed with regard to the different diameter of wheel hub. Installation is easily accomplished, and no greater effort is required in the event that it is necessary to detach the seal element. If it is desired to retain the conventional gear case seal, rather than use the seal 23, then the seal 23 will simply be omitted at the time of installing the right-hand bearing 20, FIG. 5.

Figure 2:
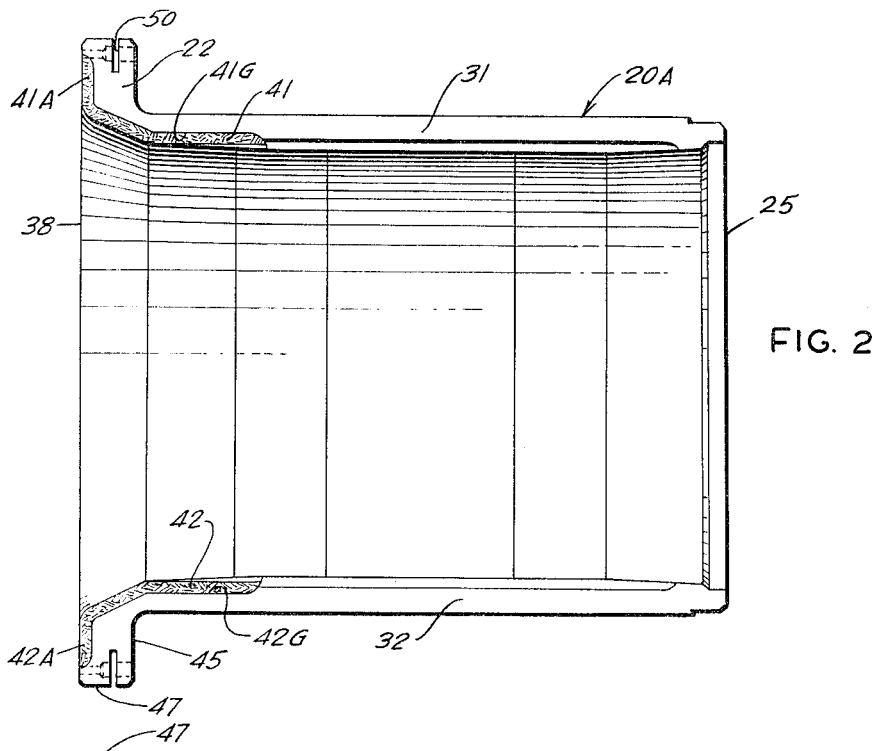
FIG. 2 is a plan view looking into the inside diameter of one of the bearing segments included as a part of the bearing assembly shown in FIG. 1.
Figure 3:
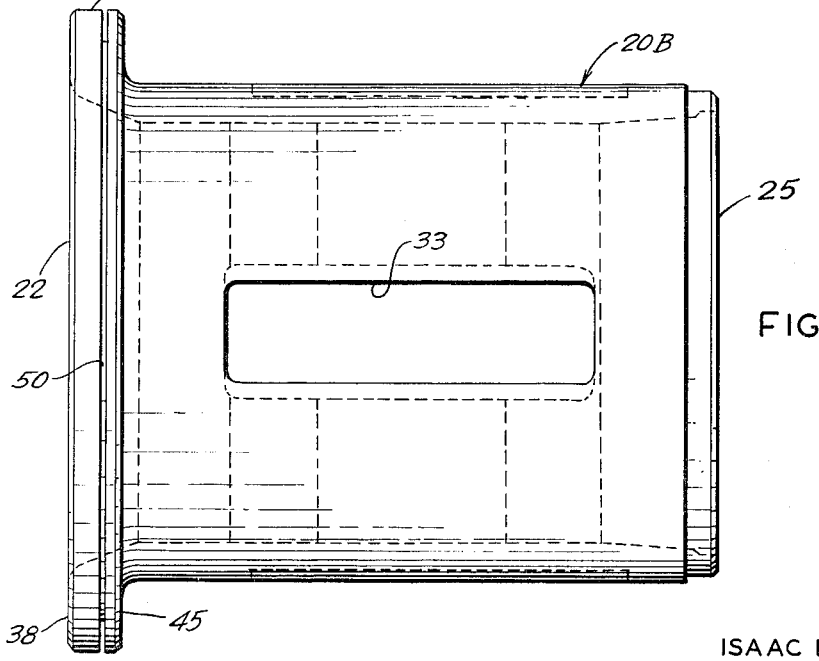
FIG. 3 is a plan view looking at the outside diameter of the other of the bearing segments included as a part of the bearing assembly shown in FIG. 1.

The bearing 20, FIG. 1, is capable of being installed either on the commutator or pinion end of the axle, and includes separate segments or split bearing halves 20A and 20B of 180° form, FIGS. 2 and 3. The bearing segments 20A and 20B are sleeve-like in nature and are provided with concave bearing surfaces, such that when the segments are assembled in the manner illustrated in FIG. 1, they cooperate to define a 360° bearing bore 30 which complies with the geometry of the diameter of axle 15 in the portion thereof that is common to the commutator end and the pinion end.

The bearing segments or bodies 20A and 20B are cast to include elongated axial body portions 25, FIGS. 2, 3 and 5, semi-cylindrical in form, which present diametrically opposed flat mating faces 31 and 32, FIGS. 1 and 2, and a key, as disclosed in my aforesaid patent, is effective to maintain the desired position of the bearing assembly in the support housing (not shown) when the segments are fitted into the support that is afforded by the motor frame as mentioned above. In this connection, it is to be pointed out that one bearing segment of each bearing assembly, as 20B, FIGS. 1 and 2, has the bore thereof interrupted by a so-called window opening 33 in which a lubricator (not shown) is disposed. This lubricator is effective to relay lubricant from a reservoir in the bearing support housing to the axle 15 so that a film of lubricant is presented between the axle and the opposed surfaces presented by the bore 30 of the bearing.

As was mentioned, each bearing segment is provided with a thrust flange 22. The load bearing body portion of the thrust flange is of a material homogeneous with the bearing body that includes the axial body portion 25 identified above, which is to say that each segmental bearing body includes an integral annular radial thrust flange which, as shown in the drawing, includes in such homogeneous portion thereof mounting recess means for the attaching flange of a dust guard or seal attachment and additional or auxiliary recess means for retainers as hereinafter described, and as will be explained in greater detail hereinafter, these thrust flanges present outermost thrust faces that afford thrust bearings engageable with the opposed faces of the hub of the wheel W1 or the hub of the gear 16 as the case may be, depending upon whether the bearing 20 is installed at the commutator end of the axle or the pinion end of the axle as will be evident from FIG. 5.

Thus, as shown in FIG. 5, the hub 17 of the wheel W1 presents a thrust face 37 engageable with the thrust face 38 that is a part of the flange 22 of the bearing 20L. In like manner, the gear hub 18 presents a thrust face 39 engageable with the opposed thrust bearing surface presented by the thrust flange 22 included as a part of the bearing 20R.

Referring to FIGS. 1, 2 and 3, it will be observed that the arcuate thrust bearing faces 38 presented by the bearing segments 20A and 20B are of 180° form in compliance with the segmental nature of the bearing segments, and these thrust faces meet at the parting faces 31 and 32 so that in the assembly a 360° thrust face is presented.

In accordance with the disclosure in my Patent No. 2,997,348, lubricant is furnished to the thrust face of the bearing by wicks as 41 and 42, FIG. 2. The wicks 41 and 42 are located in grooves 41G and 42G formed in the parting face 31 and 32 of each bearing segment. The wicks 41 and 42 include radial portions 41A and 42A disposed in corresponding pockets formed in the thrust face of each bearing flange 22 at the parting faces of the bearing flange. Portions of the wicks extend axially therefrom in the direction of the opposite end of the bearing and receive oil relayed from the axle as an incident to rotation of the axle in the manner explained in my Patent No. 2,997,348.

The thrust flange 22 of each bearing includes an arcuate inner surface 45, FIGS. 2 and 3, which is opposite and substantially parallel to the planar thrust bearing face 38 which extends substantially normal to the axis of the bearing body as shown, and as shown in FIG. 5 the rear surfaces 45 of bearing flanges 22 in the bearing assemblies are presented to the corresponding end surfaces of the motor frame MF. This is important for reasons to be explained hereinafter.

The circumferential limits of each bearing flange 22 are defined by a semi-circular peripheral surface 47, FIGS. 2 and 3, the peripheral surface 47 joining the thrust face 38 and the opposed rear surface 45.

Under and in accordance with one form of the present invention, the annular peripheral surface 47 of the bearing flange 22 is formed with a semi-circular groove or pocket 50 which, as shown particularly in FIG. 2, is continuous from the one parting face 31 to the other parting face 32. In other words, the ends of the groove 50 open at the parting faces of the bearing segment in each instance. The groove 50 is in a plane normal to the axis of the bearing.

The groove 50 as thus provided in the thrust flange of each bearing 20 is sized to neatly accommodate therein the attaching flange of a dust guard. There may be two dust guards 21 and 23 as has been noted, one at the commutator end of the axle and one at the pinion end of the axle.

Each dust guard or seal consists of two 180° segments 51A and 51B, FIGS. 1 and 6, which meet one another at end parting faces 52. The parting faces 52 of the dust guard segments coincide with the parting faces of the bearing segments.

Each dust guard segment includes a 180° attaching flange 53 that projects radially into the mounting groove or pocket 50 afforded therefor in the flange 22 of the bearing with one side of the attaching flange engageable with one wall 50W of the groove 50. Each seal segment also includes an arcuate, semi-circular collar portion 54 that is radially outward of the annular peripheral surface 47 of the bearing flange 22. In fact, the collar is concentric to the bearing flange surface 47. The collar 54 of the dust guard segment terminates in an arcuate lip 55 which is bent radially inward as shown in FIG. 4.

Figure 4:
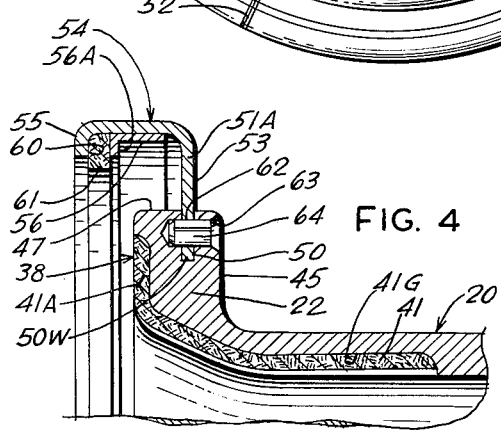
FIG. 4 is a fragmentary detail sectional view of one end of the bearing shown in FIGS. 1, 2 and 3.

An arcuate 180° seal ring retainer 56, L-shaped in section as shown in FIGS. 4 and 7, is secured to the radial inner face of the collar 54, as by a spot weld or the like. The retainer 56 includes a radially inwardly directed leg 56A which extends parallel to the lip 55 in spaced relation thereto, defining a pocket 60 into which is pressed a 180° seal 61 of felt or the like. The seal 61 is held in place by a suitable resin cement. When the dust guard segments are abutted, the ends of the felt segments 61 meet at the parting lines 52, FIG. 1, and complete a 360° seal ring.

Each segment of a dust guard is secured by removable retainers to a related bearing segment, and these retainers include portions disposed in openings in the rear or inner surface 45 of the bearing flange so as to be protected against displacement by the adjacent face presented by the end of the motor frame. Further, the retainer-receiving openings extend to or communicate with the pocket as 50 in which is disposed the attaching flange of the dust guard segment. Preferably, such retainers are in the form of roll pins.

Thus, and referring to FIGS. 4 and 6, the end of the attaching flange 53 of each dust guard segment as 51A is formed with an opening 62 which will be located within the groove 50 when the dust guard is properly related to the bearing flange.

There are two such openings 62 as indicated in FIGS. 1, 6 and 7, these openings being at the opposite ends of the attaching flange of the related dust guard segment, and each such opening is adapted to register with a retainer receiving opening 63 formed inward from the surface 45 of the bearing flange to communicate with the groove or recess 50 in which the attaching flange of the dust guard segment is disposed.

When the openings 62 and 63 have been registered, the parting end faces of the dust guard segments are at the parting faces of the bearing segments, and retainers in the form of roll pins 64 are pressed into the openings 63 and 62 thereby fixing the dust guard segment 51A or 51B immovably to the bearing segment. This attachment procedure is completed prior to the bearing segments being assembled about the axle 15, and as noted above, the end of the motor frame, FIG. 5, will prevent displacement of the retainers 64 after installation.

Figure 8:
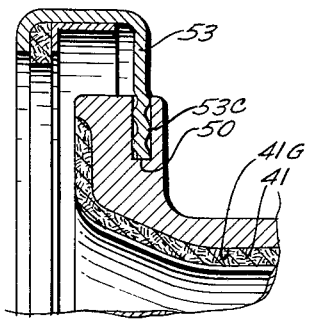
FIG. 8 is a sectional view similar to FIG. 4 illustrating a modified form of dust guard attaching flange.
Figure 9:
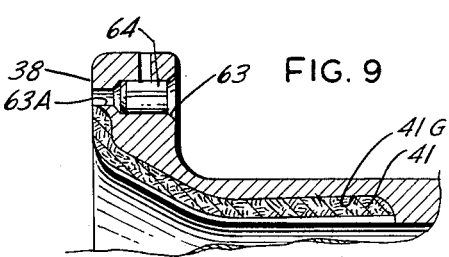
FIG. 9 is a fragmentary detail sectional view of an end of the bearing shown in FIGS. 1, 2 and 3, but modified to facilitate removal of the dust guard retainers.

As shown in FIG. 8, the portion of the attaching flange 53 that is to be disposed in the mounting pocket 50 provided therefor in the bearing flange may be corrugated as at 53C in order to dampen out vibrations that may be induced in the dust guard segment. Additionally, as shown in FIG. 9, the opening 63 in which the dust guard flange retainer is to be located may include an extension 63A which opens at the thrust face 38 of the bearing flange, such extension enabling a punch element or the like to be set therein incidential to forcefully displacing the retainers 64 when it is desired to disassociate the dust guard segment and the bearing segment.

As shown in FIG. 5, the seal ring 61 is presented by the dust guard 21 to the outer peripheral surface of the hub 17 of the wheel W1, and is effective to afford a 360° dust-tight seal between the wheel W1 and the bearing 20L. It may be observed that one of the segments affording the dust guard 21 is formed with a drain opening D, FIG. 5, for the purpose of draining any excess oil trapped behind the seal 61.

The bearing 20R, FIG. 5, is identical in construction to the bearing 20L, and in fact its identity is demonstrated by the use of the single reference character 20 to identify the bearing in FIGS. 1, 2 and 3 that interchangeably can be the bearing 20L or the bearing 20R, FIG. 5. This interchangeability enables the seal 23 for the gear hub 18 to be applied to a bearing 20 in lieu of the seal 21 in the instance where the gear is to have a dust guard associated therewith in the manner contemplated by the present invention.

Thus, the gear seal attachment or dust guard 23, FIG. 5, is quite similar in construction to the dust guard 21 associated with the wheel W1. The dust guard 23 includes a pair of 180° segments as 23A, FIG. 5, similar to the segments 51A and 51B, FIG. 6. Each such segment as 23A comprising the seal attachment 23 includes an arcuate 180° attaching flange 65 which again is of a width to fit the groove or slot 50, which also accommodates the attaching flange 53 of the dust guard 21 in keeping with the concept of interchangeability.

However, in view of the fact that the gear hub 18 is of a diameter smaller than the diameter presented by the outer surface of hub 17 of the wheel W1, the radial dimension of the attaching flange 65 is shorter in comparison to the radial dimension of the attaching flanges 53 of the segments that comprise the dust guard 21.

As in the instance of the dust guard 21, the dust guard 23 includes an axially extending collar 67 having a free end extended beyond the thrust face of the flange 22 of the bearing 20R, and this collar terminates at its outer extremity in an arcuate radially inwardly directed lip 68.

An arcuate seal retainer 69 is secured to the inner face of the collar 67, and this retainer includes an arcuate, radially inwardly directed lip 69A which cooperates with the lip 68 to afford an arcuate mounting groove or recess in which is disposed a 180° felt segment 70 which, in cooperation with a like felt segment included in a dust guard segment mating with the segment 23A at the pinion end of the bearing 20R, completes a 360° seal contact with the hub 18 of the gear 16.

The gear 16 is arranged within a gear case 75, and in order to maintain the interior of the gear case 75 free of the contaminating influence of the external environment, the side of the gear case or housing 75 adjacent the motor frame MF is equipped with an annular U-shaped seal attachment 76 which presents an inwardly opening U-shaped pocket 77 in which is disposed a seal ring 78 of felt or the like that embraces the external diameter of the gear seal 23. From this it will be recognized that movements of the gear casing 75 independent of the axle 15 have no effect on the efficiency of the dust guard seal ring 70 which embraces the gear hub 18.

The arrangement of seals shown in FIG. 5 associated with the gear 16 and the gear casing 75 is a significant departure from the conventional arrangement in which the gear case supports a dust guard attachment presenting two coaxial seal rings spaced to respectively engage the gear hub 18 and the outer peripheral surface of the thrust flange of the bearing at the pinion end of the axle. Thus, in the conventional arrangement, coxial seals aforesaid are supported in a single holder which in effect is a part of the gear casing, and both seals will move with the gear casing. It often happens, moreover, that there is excessive build-up of oil pressure between the coaxial seals, and it is necessary to take extra special precautions to relieve the pressure.

In other words, the coaxial seals aforesaid that characterize the conventional arrangement may lose contact with the bearing and the gear hub when the gear case moves eccentrically of the axle, but this is avoided under the present invention, and additionally the dust guard 23 is assembled independently of the seal attachment 76, FIG. 5, which is fixed to the gear case housing.

It will be recognized from the foregoing that in the event it is desired to associate the bearing 20R with the conventional seal structure for the gear hub 18, carried by the gear case housing 75 as explained above, then the dust guard attachment 23 will be omitted from the bearing 20R, further evidencing the flexibility and single inventory control aspects of a bearing constructed under and in accordance with the present invention.

The important aspect of the present invention is that the flange of the bearing be provided with a groove located between the mating faces 31 and 32 in either the peripheral outer surface 47 of the flange, or the inner surface 45 opposite the thrust face 38, to neatly receive the attaching flange of the dust guard. Such groove should be in a plane normal to the axis of the bearing in order that the attaching flange of the dust guard will extend radially outward from the peripheral surface 47 of the bearing flange.

Additionally, it is important that the side of the flange opposite the thrust face be provided with openings that communicate with the recess for the attaching flange of the dust guard in order to locate the attaching flange securing means as 64 therein in position to be protected against displacement by the adjacent end of the motor frame MF.

Figure 10:
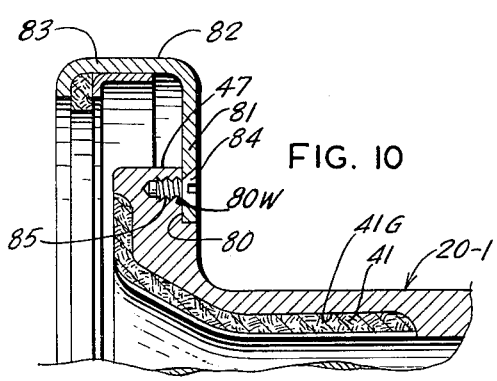
FIG. 10 is a sectional view similar to FIG. 4 showing a modified form of securing the attaching flange of the dust guard segment in a circumferential groove in the bearing segment.

Thus, various configurations and materials can be used in constructing the dust guard per se, and referring to FIG. 10, the bearing segment 20-1 is formed with a continuous arcuate groove 80 affording a seat or pocket for the 180° attaching flange 81 of a dust guard segment 82 which, except for a greater axial length for the collar 83 thereof, is identical to the dust guard segment above described adapted to engage a wheel hub.

The attaching flange 81, FIG. 10, is secured in place, with one side of the flange 81 engageable with the wall 80W of the recess means 80, by attaching screws 84 that seat in tapped openings 85 that are formed in the thrust flange of the bearing segment 20-1 inward of and in communication with the groove 80.

The dust guard segment can be entirely of one-piece construction aside from the felt seal associated therewith. This is illustrated in FIG. 11 in connection with a dust guard segment 90 having a collar 91. The collar 91 has an inner arcuate rim 92 adapted to fit flush in contact with the outer peripheral surface of the thrust flange of the related bearing segment 20-2. An attaching flange 93 projects radially inwardly from the face 92 of the collar 91 that is in contact with the outer peripheral surface of the flange of the bearing 20-2, and the attaching flange 93 seats neatly in an arcuate groove 95 formed inward from the outer peripheral surface of the bearing segment 20-2. As in the instance of the dust guard 21, the dust guard 90 is secured in position by roll pins 96 seated in openings extended inward from the surface of the flange opposite the thrust face thereof.

The collar of the seal 90 projects radially outward of the flange of the related bearing, and includes an overhanging lip portion 96 formed with a 180° groove in which is fitted a felt seal 97 of corresponding arcuate extent.

There are circumstances where it may be advantageous to compose the dust guard of a sturdy, durable plastic material, a corresponding dust guard segment being identified by reference character 100 in FIG. 12, and there illustrated in association with a related bearing segment 20-3. The segment 100 includes a radial leg 100A having an arcuate inner face 101 adapted to be pressed to a tight fit against the outer peripheral surface 102 of the flange portion 103 of a related bearing segment 20-3. The leg 100A of the dust guard 100 is grooved, and an arcuate 180° attaching flange 105 is embedded therein and includes a portion extending radially inwardly of the inner periphery 101 of the dust guard segment to seat neatly in an arcuate groove 107 formed in the flange 103 of the bearing segment 20-3. Again, roll pins are used to secure the attaching flange 105 in place in the manner described above.

The dust guard 100 includes an axially extending collar 100B that projects axially beyond the thrust bearing face of the bearing flange 103. A groove 108 is formed in the inner face of the extension 100B, and a felt seal 109 of 180° extent is fitted therein to afford a seal ring of the kind described above.

The dust guard segments above described, with the exception of that illustrated in FIG. 12, are of metal stock, and resort is had to a separate arcuate holder or retainer 56, FIG. 4, secured within the rim or collar of the segment. This retainer has a lip as 56A that cooperates with an opposed lip as 55 at the outermost extremity of the dust guard segment to afford an arcuate recess or pocket for retaining the felt seal. It may here be noted, then, that both lips for defining a recess for the felt, or equivalent resilient seal, can be formed integral with the dust guard frame or housing, and this is illustrated in FIGS. 13 and 14.

Referring to FIG. 13, the dust guard 115 consists of a single strip of rolled steel including an attaching flange 116 secured to the thrust flange of the bearing 20-4 in the manner described above. The collar 117 is formed to have a pair of parallel inner and outer arcuate walls 118 and 119 which are spaced to define a groove 120 adapted to have a felt seal 121 secured therein as by a resin cement as noted above.

The felt strip 121, FIG. 13, is quite wide, and a more narrow seal element can be presented in the manner illustrated in FIG. 14 by shaping the single strip that affords the dust guard frame to have two felt retainer lips 125 and 126 both located axially outward of the thrust face 38-5 of the related bearing 20-5.

In order to further illustrate the relatively simple inventory control that is made possible under the present invention, attention is directed to FIG. 15, showing an axle 15A having associated therewith a wheel W3 having a hub 130 of different diameter than the hub 17 of the wheel W1, FIG. 5. Nevertheless, a bearing that is identical to the bearings above described in connection with FIG. 5 can be associated with the wheel W3, it merely being necessary to select a dust guard as shown in FIG. 15 configured to present a seal ring having a diameter corresponding to that of the wheel hub 130.

FIG. 16 illustrates a particularly efficacious way of securing the seal segment in place. Thus, in this invention, resort is had to a socket head screw 135 seated in threaded opening 136 formed in the surface 137 of the bearing flange which is opposite the thrust face 138 of the bearing segment. Advantageously, the screw 135 is of a metal harder than the seal segment 140 and the inner end thereof is provided with a dog 139 of a diameter just slightly larger than a corresponding opening 141 in the end of the seal attaching flange 142 that is seated in the bearing flange groove 143. Hence, when the screw 135 is fully seated, not only does the screw bear on the attaching flange of the seal 140, but the dog 139 pierces the opening 141.

It may be finally observed that the present invention, in addition to the advantages stressed above, affords adequate space as shown in FIG. 5 to allow the gear hub to be equipped with an oil slinger. With the conventional seal at the pinion end of the axle, discussed above, the coaxial gear and gear case seal rings of necessity are so closely spaced that there is insufficient room therebetween to enable the gear to be formed with a slinger, and this difficulty is avoided under the present invention.

It will be seen from the foregoing that under and in accordance with the present invention a separate bearing assembly is afforded for a locomotive axle or the like driven by a traction motor under circumstances where the bearing, capable of having a separable dust guard fitted thereto, can be interchangeably used at either the pinion end or the commutator end of the axle. This is made possible by providing the thrust flange of the bearing with a groove or recess means in either the arcuate outer peripheral surface thereof or in the surface that is opposite and parallel to the thrust face of the bearing flange. Having such a groove or pocket, the attaching flange of a dust guard segment can be fitted therein and secured in place by retainers inserted in openings or auxiliary, additional recess means in the bearing flange which extend substantially at right angles to the radius of the bearing flange as shown in the drawing, and which are preferably located in the surface of the bearing flange that is opposite the thrust face thereof, and by so locating the retainers and the retainer receiving openings, the retainers will be protected against displacement by the adjacent face of the end of the motor frame.

Under the present invention, it is not necessary to maintain an inventory of bearings having integral dust guards that are related to hub sizes of different standards. A dust guard segment under the present invention is easily associated with the related bearing segment and can be assembled on the axle simultaneously with and as a part of the bearing halves. If a dust guard presenting a different seal diameter is required, a different seal segment is presented rather than a different bearing. Hence, while preferred embodiments of the present invention have been disclosed, these are capable of variation and modification, and I therefore do not wish to be limited to the precise details set forth, but desire to avail myself of such changes and alterations as fall within the purview of the following claims.

I claim:

1. A split bearing for a traction motor axle having a commutator end adjacent a wheel on the axle and a pinion end adjacent a driven gear on the axle and comprising, a pair of arcuate complementally related bearing segments adapted to be interchanged with one another at either end of the axle and each having an axial sleeve portion and a radial thrust flange projecting outwardly from one end of the sleeve; each such sleeve and flange presenting a pair of terminal axially extending faces separated by the intervening arcuate body of the segment, said faces being engageable with like faces on the other segment to define a 360° bearing bore in which can be fitted either the commutator end of the pinion end of the axle; the flange of each segment including a portion entirely of a homogeneous material and presenting (1) a thrust bearing face engageable with the hub of said wheel or the hub of said gear, (2) a rear surface facing away from the thrust bearing side of the flange and (3) an outermost arcuate peripheral surface that separates the bearing face and the rear surface; said portion of the flange that is of homogeneous material having an outwardly opening groove formed entirely therein and located between said thrust face and said rear surface; a pair of dust guard segments each having an arcuate attaching flange carried thereby with openings formed therein and being freely and separably fitted in a related one of the grooves to extend outwardly around the bearing segments from the one terminal mating face thereof to the other, each of said dust guards having a portion overhanging the thrust bearing face of the related bearing segment and having arcuate seal retainer means with ends terminating at the axially extending faces of the related bearing segment in a position to present an arcuate 180° seal, said thrust flanges being formed with mounting recesses that register with the openings in said attaching flanges and which extend to said grooves for replaceable retainers entered in said registered recesses and openings securing each dust guard segment to the related bearing segment.

2. A split bearing for a traction motor axle comprising, a pair of arcuate complementally related bearing segments each having an axial sleeve portion and a radial thrust flange projecting outwardly from one end of the sleeve; each such sleeve and flange presenting a pair of terminal axially extending faces separated by the intervening arcuate body of the segment, said faces being engageable with like faces on the other segment to define a 360° bearing bore for the axle; the flange of each segment including a portion entirely of a homogeneous material and presenting (1) a thrust bearing face engageable with a hub of a wheel or a hub of a gear and (2) a rear surface facing away from the thrust bearing side of the flange; said portion of the flange having an outwardly opening groove formed entirely therein and located between said thrust face and said rear surface; a pair of dust guard segments each having an arcuate attaching flange carried thereby with openings formed therein and being freely and separably fitted in a related one of the grooves to extend outwardly around the bearing segment from the one terminal mating face thereof to the other, each of said dust guards having a portion overhanging the thrust bearing face of the related bearing segment and having seal retainer means with ends terminating at the axially extending faces of the related bearing segment in a position to present an arcuate 180° seal, said thrust flanges being formed with mounting recesses that register with the openings in said attaching flanges and which extend to said grooves for replaceable retainers entered in said registered recesses and openings securing each dust guard segment to the related bearing segment.

3. A split bearing for a traction motor axle comprising, a pair of arcuate complementally related bearing segments, each having an axial sleeve portion and a radial thrust flange projecting outwardly from one end of the sleeve; each such sleeve and flange presenting a pair of terminal axially extending faces separated by the intervening arcuate body of the segment, said faces being engageable with like faces on the other segment to define a 360° bearing bore for the axle; the flange of each segment including a portion entirely of a homogeneous material and presenting (1) a thrust bearing face engageable with a hub of a wheel or a hub of a gear and (2) a rear surface facing away from the thrust bearing side of the flange, said portion of the flange having an outwardly opening groove formed entirely therein and located between said thrust face and said rear surface; a pair of dust guard segments each having an attaching flange carried thereby in a predetermined plane with openings formed thereon and being freely and separably fitted in a related one of the grooves to extend outwardly around the bearing segment from the one terminal mating face thereof to the other, each of said dust guards having a similar collar portion disposed in a plane substantially normal to the first named plane and overhanging the thrust bearing face of the related bearing segment, said collar having seal retainer means at the end of the collar opposite the attaching flange and depending therefrom in a plane substantially parallel to the first-named plane, said retainer supporting an arcuate 180° seal having ends terminating at the axially extending faces of the related bearing segment, said thrust flange being formed with mounting recesses that register with the openings in said attaching flange and which extend to said grooves for replaceable retainers entered in said registered recesses and openings securing the dust guard segment to the bearing segment.

4. A traction motor bearing element of the type having an axial sleeve portion sized to fit a journal surface of a rotating axle and a radial thrust flange projecting from one end thereof and presenting at one radially disposed surface thereof a thrust surface disposable in facing relation to a radially disposed thrust surface extending from said axle, said radial thrust flange being formed from a homogeneous body which body presents a radially disposed rear surface disposable in abutting facing relation with a traction motor frame assembly, said flange having an arcuate peripheral surface disposed between said thrust and rear surfaces thereof, and radially disposed open recess means formed wholly in said homogeneous body and being elongated in a circumferential direction and opening only at said arcuate peripheral surface included in said thrust flange between the thrust and rear surfaces thereof, said recess means being sized to removably accommodate a complementally shaped attaching flange means of a dust guard element, and said thrust flange having additional recess means formed therein substantially at right angles to the radius of said thrust flange and adapted to receive a retainer mounting and demounting the dust guard element relative to said bearing element.

5. A traction motor bearing element of the type having a body portion including an axial sleeve portion sized to fit a journal surface of a rotating axle, and a radial thrust flange including a portion of homogeneous material projecting from one end of an included in said body portion, said flange presenting at one radially disposed surface thereof a surface disposable toward a radial thrust surface extending from said axle, and said flange presenting at the other radially disposed surface thereof a rear surface disposable in abutting facing relation with a traction motor frame assembly and with an arcuate peripheral surface disposed between said thrust and rear surfaces thereof, a radially disposed open recess formed in the homogeneous material of the flange portion of said body portion and opening at said arcuate peripheral surface included in said thrust flange intermediate the thrust and rear surfaces thereof and sized to removably accommodate a complementally shaped attaching flange means of a dust guard element, and auxiliary recess means included in said thrust flange disposed substantially transverse to the plane of said thrust surface thereof in intersecting relation with said radially disposed recess and sized to accommodate detachable retaining means for mounting and demounting said dust guard element and positionable to prevent displacement of said dust guard element in a direction parallel to the plane of said thrust surface.

6. A bearing element according to claim 5 being in the form of a substantially 180° segment, and wherein the auxiliary recess means include one each adjacent each end of the bearing segment to enable a dust guard element of similar arcuate extent to have the ends thereof accurately registered with the ends of the bearing segment.

7. A traction motor bearing element having a fixed bearing body with an arcuate bearing surface, said bearing surface defining an axial sleeve portion sized to encompass approximately 180° of the journal surface of a rotating axle, said bearing body having an annular thrust flange including a portion formed from a homogeneous body and extending substantially radially with respect to the axis of said sleeve portion, the homogeneous portion of said thrust flange having:

(a) a planar front surface extending in a plane substantially normal to the axis of said sleeve portion to be disposed toward a rotating hub on the axle;

(b) a rear surface extending in a plane substantially parallel to the plane of said front surface and adapted to lie adjacent a housing for the traction motor; and (c) a peripheral surface disposed between said front and rear surfaces;

and recess means formed in the homogeneous material of the flange portion of said bearing body and being elongated in a circumferential direction and extending radially inward from said peripheral surface toward the axis of said sleeve portion, said recess means presenting a wall substantially parallel to the rear surface of the thrust flange, and said wall being engageable by one side of an attaching flange of a segmental seal attachment separably fitted in said recess means, and additional recess means formed in said bearing flange substantially at right angles to the radius thereof and enabling retainer means to be entered therein for mounting and demounting said seal attachment relative to said bearing element.

8. A bearing according to claim 7 in which said recess means is a continuous annular groove of substantially 180° extent.

9. A bearing element according to claim 7 wherein the additional recess means formed in the bearing flange extend axially of the bearing flange and are in communication with the first-named recess means, and said additional recess means opening in the direction of the rear surface of the bearing flange enabling the retainer means to be entered from that direction whereby displacement of the retainer means will be prevented by said motor housing.

References Cited by the Examiner

UNITED STATES PATENTS

| 1,300,294 | 4/1919 | Pribil | 308—36.1 |
| 1,300,507 | 4/1919 | Starker | 308—36.1 |
| 2,243,009 | 5/1941 | Kingsbury et al. | 308—36.1 |
| 2,955,001 | 10/1960 | Rich | 308—36.1 |
| 3,127,222 | 3/1964 | Hanson | 308—36.1 |

FOREIGN PATENTS 63,221   3/1945   Denmark.

DAVID J. WILLIAMOWSKY, *Primary Examiner.*

ROBERT C. RIORDON, DON A. WAITE, *Examiners.*

D. C. CHAMPION, F. SUSKO, *Assistant Examiners.*